United States Patent
Babcock et al.

(10) Patent No.: US 8,511,555 B2
(45) Date of Patent: Aug. 20, 2013

(54) TAG COMMUNICATION, IDENTIFICATION, AND TRACKING APPARATUS AND SYSTEM

(76) Inventors: William J. Babcock, Bentonville, AR (US); Bruce K. Babcock, Bentonville, AR (US)

( * ) Notice: Subject to any disclaimer, the term of this patent is extended or adjusted under 35 U.S.C. 154(b) by 56 days.

(21) Appl. No.: 13/103,507

(22) Filed: May 9, 2011

(65) Prior Publication Data
US 2011/0266338 A1   Nov. 3, 2011

Related U.S. Application Data

(63) Continuation-in-part of application No. 12/210,179, filed on Sep. 12, 2008, now Pat. No. 7,954,712.

(51) Int. Cl.
*G06F 19/00* (2011.01)
*G06Q 30/00* (2012.01)
*G06Q 90/00* (2006.01)

(52) U.S. Cl.
USPC ............................ 235/385; 235/375; 235/487

(58) Field of Classification Search
USPC ................. 235/385, 487, 375, 435, 382, 381, 235/378, 383; 705/22, 28; 340/540, 572.1, 340/10.42
See application file for complete search history.

(56) References Cited

U.S. PATENT DOCUMENTS

| | | |
|---|---|---|
| 4,002,886 A | 1/1977 | Sundelin |
| 4,521,677 A | 6/1985 | Sarwin |
| 4,821,291 A | 4/1989 | Stevens et al. |
| 4,973,952 A | 11/1990 | Malec et al. |
| 5,723,204 A | 3/1998 | Stefik |
| 5,995,015 A | 11/1999 | DeTemple et al. |
| 6,089,453 A | 7/2000 | Kayser et al. |
| 6,094,642 A | 7/2000 | Stephenson et al. |
| 6,313,745 B1 | 11/2001 | Suzuki |
| 6,348,908 B1 | 2/2002 | Richley et al. |
| 6,427,922 B1 | 8/2002 | Marchand |
| 6,486,861 B1 | 11/2002 | Preas et al. |
| 6,547,140 B2 | 4/2003 | Marchand |
| 6,573,880 B1 | 6/2003 | Simoni et al. |
| 6,588,131 B2 | 7/2003 | O'Connell, Jr. |
| 6,753,830 B2 | 6/2004 | Gelbman |
| 6,885,032 B2 | 4/2005 | Forbes et al. |

(Continued)

FOREIGN PATENT DOCUMENTS
WO     2006087424     8/2006

OTHER PUBLICATIONS

Notice of Allowance, dated Jan. 28, 2011, U.S. Appl. No. 12/210,179.
Office Action, dated Nov. 4, 2010, U.S. Appl. No. 12/210,179.

(Continued)

*Primary Examiner* — Edwyn Labaze

(57) ABSTRACT

Embodiments of the present invention provide an apparatus and system for supply chain management. The system permits an application server to collect information such as, for example, the spatial and temporal relationship between tags associated with a supply chain item by using a wireless communications device. Embodiments of the present invention may be used throughout any or all locations of a supply chain. For example, when the invention is applied to a retail setting, the retailer can track inventory in an establishment with minimal human involvement. In various embodiments of the present invention, two-way communication between tags and/or an application server allow data to be transmitted and/or received between one or more tags and/or one or more application servers.

21 Claims, 9 Drawing Sheets

(56) References Cited

U.S. PATENT DOCUMENTS

| | | |
|---|---|---|
| 6,924,781 B1 | 8/2005 | Gelbman |
| 6,972,682 B2 | 12/2005 | Lareau et al. |
| 7,028,339 B2 | 4/2006 | Stevens |
| 7,049,963 B2 | 5/2006 | Waterhouse et al. |
| 7,090,125 B2 | 8/2006 | Goel et al. |
| 7,164,359 B2 | 1/2007 | Waterhouse et al. |
| 7,170,413 B1 | 1/2007 | Waterhouse et al. |
| 7,242,290 B2 | 7/2007 | Stevens |
| 7,242,301 B2 | 7/2007 | August et al. |
| 7,954,712 B2 | 6/2011 | Babcock et al. |
| 2005/0030160 A1* | 2/2005 | Goren et al. ............ 340/10.5 |
| 2005/0199716 A1 | 9/2005 | Shafer et al. |
| 2006/0047464 A1 | 3/2006 | Kumar et al. |
| 2006/0163349 A1* | 7/2006 | Neugebauer ............ 235/383 |
| 2007/0182565 A1* | 8/2007 | Lee et al. ............ 340/572.8 |
| 2007/0285238 A1* | 12/2007 | Batra ............ 340/572.1 |
| 2008/0094215 A1* | 4/2008 | Amador et al. ............ 340/572.1 |
| 2008/0129456 A1 | 6/2008 | Stevens et al. |
| 2008/0231449 A1 | 9/2008 | Moshfeghi |
| 2009/0045918 A1* | 2/2009 | Droesler et al. ............ 340/10.1 |

OTHER PUBLICATIONS

Response, dated Jan. 7, 2011, U.S. Appl. No. 12/210,179.

Hardgrave, et al., "Item-Level RFID: Future Direction—Current Status, RFID Item-LevelTagging for Apparel/Footwear: Feasibility Study", InformationTechnology Research Institute Working Paper Series, Jun. 5, 2008.

* cited by examiner

TAG COMMUNICATION, IDENTIFICATION, AND TRACKING APPARATUS AND SYSTEM

CROSS-REFERENCE TO RELATED APPLICATIONS

This application is a continuation-in-part of U.S. application Ser. No. 12/210,179, filed Sep. 12, 2008, entitled "Product, Asset, and Device Tracking, Identification, and Pricing System," the entirety of which is hereby incorporated by reference.

FIELD OF THE INVENTION

The present disclosure relates generally to an apparatus and system for supply chain management and, more particularly (although not exclusively), to communications between one or more tags and/or one or more application servers.

BACKGROUND

The life cycle of a product is generally traceable using logistics. Supply chain logistics often begin with the manufacturing of a product and generally govern the manner by which a product is made, sold, packaged, shipped, delivered, and inventoried under wholesale conditions. In addition, supply chain logistics may continue at the retail level where retailers store and display inventory for sale One variable that may cause interruptions within a supply chain is human error. Human error can make it difficult to capture a true picture of a supply chain because a human error may propagate throughout the supply chain. For example, a miskeyed order for a pallet of products may affect a retailer's ability to shelve products, while the same error may result in collections issues for the wholesaler's accounts receivable. Numerous examples exist where human error negatively impacts supply chain logistics. The result of each human error is that logistics data is increasingly difficult to find, sort, and verify. Even if data is readily available, human error may render the data unreliable. Data availability and reliability may be negatively affected until an error is located and repaired; however, locating an error may require expensive data analysis. To increase efficiency and accuracy in a supply chain, there has been an effort to automate many tasks that are susceptible to human error, thus, minimizing avoidable costs.

Furthermore, loss prevention (preventing goods being damaged, stolen, mishandled, misidentified, or misplaced) and marketing/advertising (e.g. displaying advertisements for goods, pricing, price changes, etc.) are considerations in supply chain logistics. Loss prevention can be detrimentally affected by human error, accounting issues at the front end and/or the back end of a supply chain, and a lack of security for the goods being transported in the supply chain. Marketing/advertising costs can reduce profits for sellers and other supply chain entities. For example, creating and changing displays for goods, and associating prices and price changes to goods, can be labor intensive and thus costly endeavors.

Therefore, systems and methods to reduce the opportunity for human error affecting supply chain data and/or to cost effectively increase loss prevention and marketing/advertising are desirable.

SUMMARY

Embodiments of the present invention provide an apparatus and system for supply chain management. In one embodiment, a tag is configured for being physically associated with a supply chain item. In this embodiment, the tag comprises a processor, a memory configured for storing data elements, and a wireless communications device. The wireless communications device may be configured for transceiving wireless communications with a second device that is physically separate from the tag. The wireless communications may comprise a representation of at least one of the data elements comprising a characteristic associated with the tag. The representation may be usable by the second device to determine information to wirelessly transmit to the tag. In one embodiment, the processor is configured for executing code stored in the memory to respond to the information wirelessly transmitted from the second device by configuring at least one of the data elements based on the information. At least one of the data elements representing data may be usable to process payment for the supply chain item. At least one of the data elements representing data may be usable to configure a display.

In one embodiment, a system comprises an application server, a tag configured for storing data elements and further configured for wireless communications with the application server and a second device physically separate from the tag. The second device may be configured for wireless communications with the tag. The wireless communications can comprise a representation of at least one of the data elements comprising a characteristic associated with the tag. The tag may be configured for responding to the information wirelessly transmitted from the application server or the second device by configuring at least one of the data elements based on the information or wirelessly transmitting information about at least one of the data elements to the second device or the application server. In some embodiments, at least one of the data elements representing data is usable by at least one of the application server or the second device to process a payment for a product associated with the tag. In one embodiment, at least one of the data elements representing data is usable by a display device to display information about the product associated with the tag.

In one embodiment, a non-transitory computer-readable medium is disposed in a tag comprising program code. The program code may comprise program code for receiving wireless communications from a second device that is physically separate from the tag. The wireless communications can comprise a representation of at least one data element comprising a characteristic associated with the tag, the representation being usable by the second device to determine information to wirelessly transmit to the tag. The program code may comprise program code for responding to the information wirelessly transmitted from the second device by configuring a data element based on the information. At least one data element representing data may be usable by the second device to process payment for a product associated with the tag. At least one data element representing data may be usable by a display device to display information about the product associated with the tag.

These illustrative aspects and embodiments are mentioned not to limit or define the invention, but to provide examples to aid understanding of the inventive concepts disclosed in this application. Other aspects, advantages, and features of the present invention can become apparent after review of the entire application.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of an apparatus and system for supply chain management. The following description is illustrative and is not intended to be in any way limiting. Further, in the disclosed embodiments below, the term "or" may be used to describe different features of particular embodiments. Use of the term "or" is intended to be interpreted both as inclusive and exclusive, thus combinations may include any or all of the identified features as described herein. Reference can now be made in detail to implementations of example embodiments as illustrated in the accompanying drawings. The same reference indicators can be used throughout the drawings and the following description to refer to the same or like items.

Illustrative Tag Device

Figure 1:
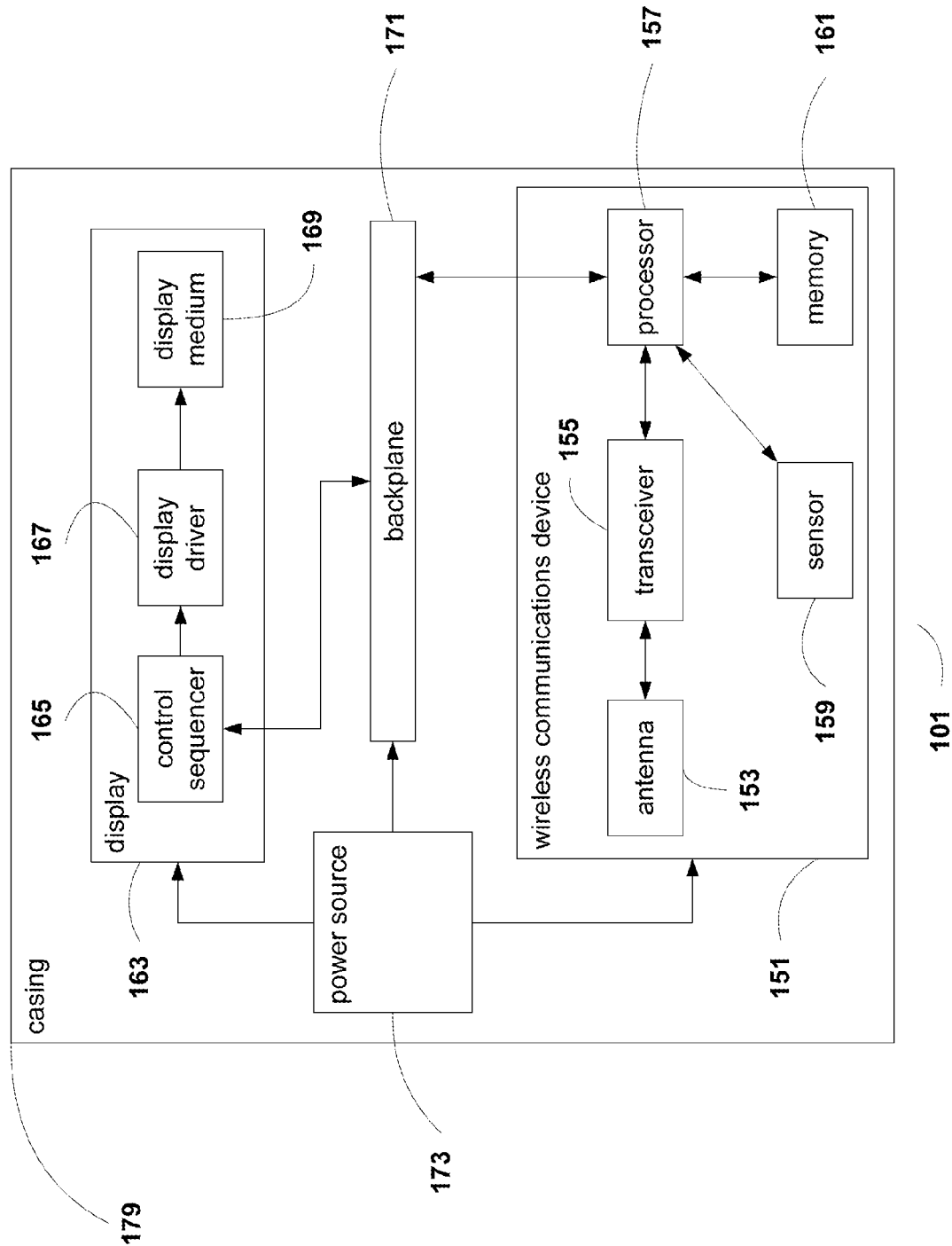
FIG. 1 is a block diagram of a tag according to one embodiment of the present invention.

FIG. 1 depicts a tag 101 according to one embodiment of the present invention. The tag 101 includes a casing 179, a power source 173, a wireless communications device 151, a display 163, and a backplane 171. The casing 179 can provide protection to the tag 101 from external conditions. The power source 173 can provide power to the various components of the tag 101 from an external power source or from stored power. The wireless communications device 151 can send and receive signals to and from a transceiver (not shown). The display 163 can visually display data and change the displayed data when new data is received. The backplane 171 can provide data transfer between the wireless communications device 151 and the display 163.

The tag 101 may be any type of device, collection of devices, or circuitry that can send and receive signals to and from a wireless transceiver and can process the received signals. The tag 101 may incorporate fewer components or additional components than the embodiments described herein so long as the device is operable to communicate with a transceiver. For example, in one embodiment the tag 101 includes a processor 157, a memory 161, and a wireless communications device 151. In another embodiment, the tag 101 includes a power source 173, an antenna 153, a transceiver 155, a processor 157, and a memory 161. The tag 101 may include a display 163.

In one embodiment, the tag 101 is physically associated with a supply chain item. For example, the tag 101 can be physically attached to the packaging of a product. The tag 101 may be embedded within a product, directly affixed to a product, attached to a pallet or a shelf, affixed to an employee badge or a customer membership card, or associated with one or more display devices. In various embodiments, a tag may be incorporated into, affixed to, coupled to, or otherwise associated with any item in a supply chain. Examples of items in a supply chain include, but are not limited to, a product, lot, pallet, display, employee, customer, membership card, shelf, zone, boundary, cart, basket, loading dock, entryway, a cellular phone, or security camera.

In one embodiment, the memory 161 is configured for storing one or more data elements. Data elements may include, for example, information such as associations with other tags, an address, a location, a zone, a price, a condition, a status, a boundary, a permission level, and/or other types of data elements.

In some embodiments, the wireless communications device 151 is configured for transceiving wireless communications with a second device that is physically separate from the tag. In this embodiment, the memory 161 is configured for storing data elements and the wireless communications include a representation of at least one of the data elements including a characteristic associated with the tag, the representation being usable by the second device to determine information to transmit wirelessly to the tag. In one embodiment, the processor 157 is configured for responding to information wirelessly transmitted from a second device by configuring at least one of the data elements stored in the memory 161 based on the information. In some embodiments, a second device may be any type of device, collection of devices, or circuitry that can transmit and receive signals to and from a transceiver such as, for example, a second tag, a point of sale system, a router having a transceiver and an antenna, an application server, a legacy system, a sensor, or a display device.

Tags according to some embodiments may comprise a casing, a low frequency wireless communications unit comprising a low frequency antenna for receiving wireless communications, a low frequency transceiver for converting wireless communications into digital signals, a processor for processing digital signals, and/or memory. In some embodiments, the tag may comprise a display and the display may comprise a control sequencer for accepting display data form the processor, a display driver for converting the digital signals received by the control sequencer into a format displayable by a display medium, and a display medium. Tags may comprise a backplane for facilitating digital communication between a low frequency wireless communications unit and a display. The tag may be associated with supply chain items such as a product, shelf label, store display, item packaging, hanging fobs, and/or other supply chain items.

Wireless Communications Device

The wireless communications device 151 includes an antenna 153, a transceiver 155, a processor 157, a memory 161, and a sensor 159. The wireless communications device 151 can receive signals from a transceiver (not shown) and can send signals to a transceiver (not shown). In this embodiment, the wireless communications device 151 is powered by a power source 173 and the wireless communications device 151 communicates with a backplane 171. Furthermore, according to the embodiment shown in FIG. 1, the processor 157 is in communication with a transceiver 155, a memory 161, a backplane 171, and a sensor 159.

The wireless communications device 151 may be any type of device, collection of devices, or circuitry that can transmit and receive signals to and from a transceiver (not shown). Some embodiments may include fewer or additional components than those depicted in FIG. 1. For example, in one embodiment the wireless communications device 151 does not include a sensor 159. In another embodiment, the wireless communications device 151 includes multiple sensors 159. The tag 101 may include one or more sensors 159 and the wireless communications device 151 may or may not include a sensor 159. In still other embodiments, both the tag 101 and the wireless communications device 151 may include one or more sensors 159. In other embodiments, neither the wireless communications device 151 nor the tag 101 include a sensor 159. Furthermore, the wireless communications device 151 may be in communication with one or more sensors 159 external to the wireless communications device 151 and/or external to the tag 101.

In one embodiment, the wireless communication 151 device does not communicate with a backplane 171, but rather communicates directly with the control sequencer 165. In other embodiments, the tag 101 does not include a backplane 171 or a display 163, thus the wireless communications device 151 may communicate simply with a transceiver (not shown). The wireless communications device 151 may be in communication with the processor 157 and/or the memory 161 rather than being included in the wireless communications device 151. For example, in one embodiment, the tag 101 includes a processor 157 and a memory 161 and communicates with the wireless communications device 151. The tag 101 may include a processor 157 and communicate with the wireless communications device 151, which includes a memory 161. In one embodiment, the wireless communications device 151 is IEEE P1902.1 compliant.

The memory 161 may be any device, collection of devices, or circuitry that can store data. For example, the memory 161 may be a computer-readable medium such as random access memory (RAM) coupled to the processor 157. The processor 157 executes computer-executable program instructions stored in memory 161. The processor 157 may include a microprocessor, an ASIC, and state machines. The processor 157 may include, or may be in communication with, for example, a computer-readable medium, which stores instructions that, when executed by the processor 157, cause the processor 157 to perform the steps described herein. Embodiments of a computer-readable medium include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Furthermore, various other forms of a computer-readable medium may transmit or carry instructions to a computer, including a router, private or public network, or other transmission device or channel, both wired and wireless. The instructions may include code from any suitable computer-programming language, including, for example, C, C++, C#, Visual Basic, Java, Python, Perl, and JavaScript.

The antenna 153 may be any device, collection of devices, or circuitry that can send and receive electromagnetic signals. For example, in one embodiment the antenna 153 is a low frequency antenna. The transceiver 155 may be any device, collection of devices, or circuitry that can process physical signals received by the antenna 153 into digital signals and translate digital signals into radio transmissions. For example, the transceiver 155 is a low frequency transceiver according to one embodiment of the present invention. The sensor 159 may be any device, collection of devices, or circuitry that is capable of gathering and transmitting data about the environment surrounding the sensor 159. For example, in one embodiment the sensor 159 is a thermocouple sensor. The sensor 159 may be an accelerometer or an ethylene gas sensor.

Display

The display 163 includes a control sequencer 165, a display driver 167, and a display medium 169. In this embodiment, the display 163 is powered by the power source 173. Furthermore the control sequencer 165 may be in communication with the backplane 171. The control sequencer 165 translates data received from the processor 157 via the backplane 171 into a format readable by the display driver 167. The display driver 167 accepts data from the control sequencer 165 and translates the data into a format that the display medium 169 can display. The display medium 169 receives the data from the display driver 167 and visually displays the data.

The display 163 may be any device, collection of devices, or circuitry that can receive data from the wireless communications device 151 and/or the backplane 171 and can visually display the data. For example, according to one embodiment, the display medium 169 is a liquid crystal display (LCD). In another embodiment, the display medium 169 may be, for example, a bi-stable device with protective film or bi-stable paper.

Backplane

According to some embodiments, the backplane 171 is powered by the power source 173 and is communication with the control sequencer 165 and the processor 157. In this embodiment, the backplane 171 provides data transfer between the processor 157 and the control sequencer 165.

The backplane 171 may be any device, collection of devices, or circuitry that can provide data transfer between the various components of the tag 101. For example, according to one embodiment, the backplane 171 provides data transfer between the wireless communications device 151 and the display 163. In other embodiments, the backplane 171 provides data transfer between other components included in the tag 101. The backplane 171 may provide data transfer to and from one or more devices, such as a sensor, external to the tag 101. In still other embodiments, the tag includes a processor 157 and the backplane 171 provides data transfer to and from the processor 157.

Power Source & Power Management

The power source 173 can provide power to the wireless communications device 151, the backplane 171, and the display 163. The power source 173 may be any type of device, collection of devices, or circuitry that can provide suitable power for a desired length of time to various other components of the tag 101. In one embodiment of the present invention, the power source 173 may be a conventional alkaline or lithium battery or batteries. The power source 173 may also be any rechargeable battery or batteries. In other embodiments, the power source 173 may include an outlet plug or a connection to the local power grid. The power source 173 may be an ambient power source such as an inductive power antenna, solar panel, or other non-wired remote power source. In some embodiments, combinations of two or more power sources are used to provide power to the tag 101.

One embodiment of the present invention incorporates power management hardware and/or software into the tag 101. For example, if the tag 101 receives repeated consecutive requests from a second tag, then the consecutive requests can be ignored by the tag 101. In some embodiments, the consecutive requests can be ignored only if the requests are identical. In other embodiments, the consecutive requests can be ignored only if the consecutive requests occur within a specified timeframe.

The tag 101 may incorporate a battery power sensor. In this embodiment, the tag 101 is capable of notifying a second device when the battery level is below a specified threshold. Thus, notifications may be provided alerting personnel that a tag's battery or batteries should be replaced.

Casing

The casing 179 can protect the various components inside the casing 179. In the embodiment depicted in FIG. 1, the casing 179 encloses the power source 173, the display 163, the backplane 171, and the wireless communications device 151. In other embodiments, the casing 179 may enclose any number of components. The casing 179 may protect the tag 101 from external conditions, such as rain or other liquids. The casing 179 may be made of any material suitable to provide protection for the tag 101. Examples of suitable material include polyurethane, aluminum, titanium, or a titanium alloy. According to one embodiment, the casing 179 encloses the power source 173 and the wireless communications device 151. In other embodiments, the tag 101 does not include a casing 179.

Illustrative System Using Tags

Overview

Figure 2:
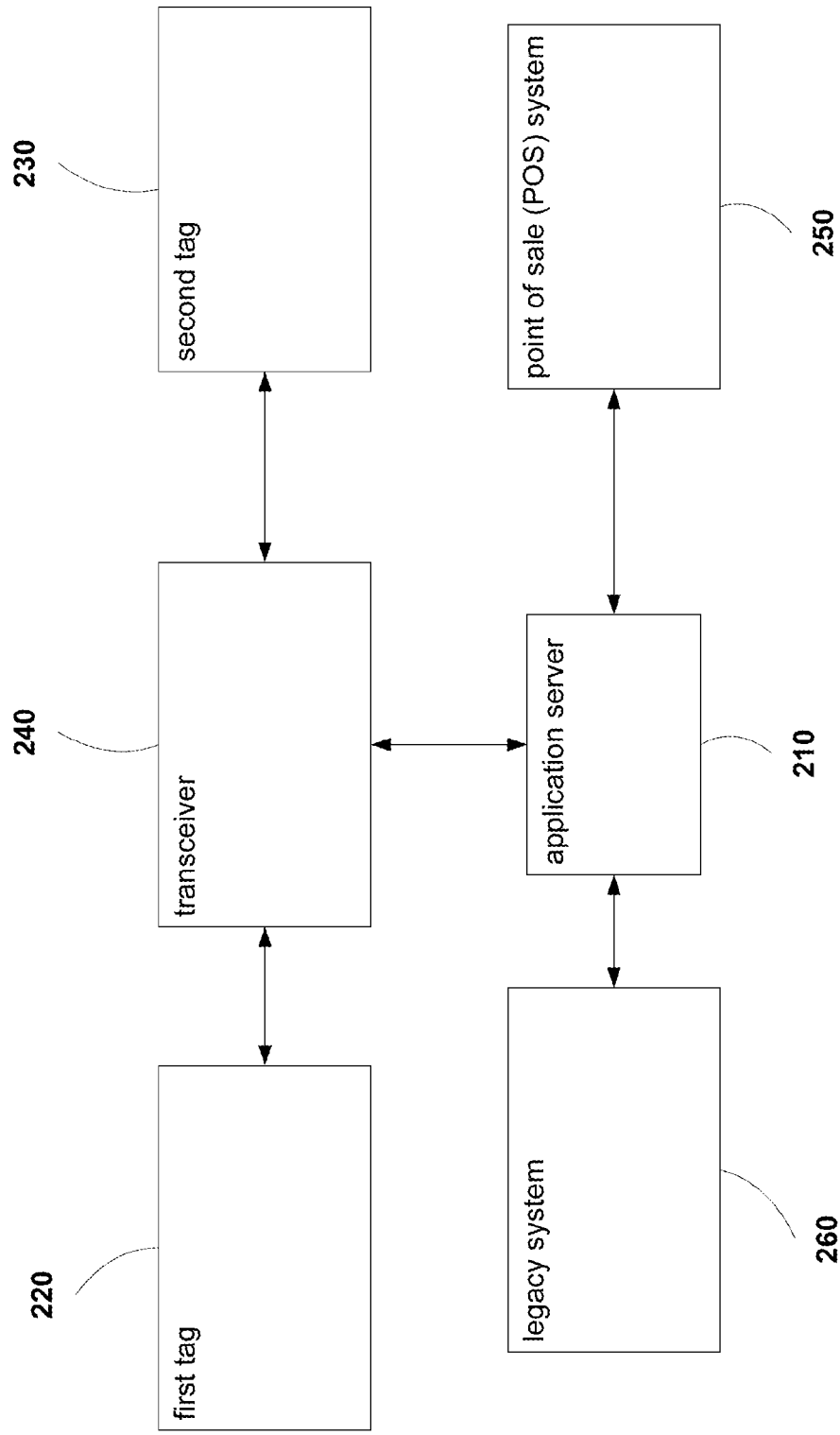
FIG. 2 is a block diagram of a system according to one embodiment of the present invention.

FIG. 2 depicts via block diagram an illustrative system for using tags according to one embodiment of the present invention. A system according to certain embodiments may be any collection of devices that can send and receive signals to and from one or more other devices in the system and can process the signals to perform at least one of the functions described herein. In FIG. 2, the system includes an application server 210, a first tag 220, a second tag 230, a transceiver 240, a legacy system 260, and a point of sale ("POS") system 250. A system in other embodiments may not include a legacy system 260 and a POS system 250 and/or may include additional components such as other tags, servers, and networking equipment.

The first tag 220 is configured for communicating with a second tag 230 physically separate from the first tag 220 via the transceiver 240. Furthermore, the first tag 220 can communicate with an application server 210 through the transceiver 240. The second tag 230 can communicate with the first tag 220 and with the application server 210 through the transceiver. The application server can communicate with the first tag 220 and the second tag 230 through the transceiver 240.

In some embodiments of the present invention, the first tag 220 can communicate with the second tag 230 and/or the application server 210 directly. The first tag 220 may communicate with one or more transceivers 240 which, in turn, communicates with the second tag 230 and/or the application server 210 directly. In various embodiments of the present invention, a transceiver 240 may be any type of device, collection of devices, or circuitry that can wirelessly communicate with the first tag 220, the second tag 230, and/or the application server 210. In some embodiments, the purpose of the transceiver 240 is to route communications between the first tag 220, the second tag 230, and the application server 210. For example, the transceiver 240 may include a wireless router. In other embodiments, the transceiver 240 can include an antenna controller, a router, a transceiver and/or an antenna. In still other embodiments, one or more wired and/or wireless transceivers are connected in order to communicate between the first tag 220, the second tag 230, and/or the application server 210. In some embodiments, a transceiver 240 may include other networking components that would be known by one of ordinary skill in the relevant art.

The application server 210 may be any type of device, collection of devices, or circuitry that can communicate with the first tag 220, the second tag 230, and/or a transceiver 240 and is capable of processing data received from the first tag 220, the second tag 230, and/or the transceiver 240. According to one embodiment, for example, the application server 210 includes one or more computing devices, including a CPU, a storage device, a user interface such as a manually operated keyboard and a mouse, and a memory. In other embodiments, the application server 210, is a battery-operated handheld device. The application server 210 may be capable of executing an operating system, such as Microsoft Windows or Linux. In one embodiment, the application server 210 is in communication with one or more legacy systems and/or one or more point of sale systems. The application server 210 may include or be communicatively associated with one or more databases. The application server 210 may also include or be communicatively associated with one or more servers in one or more locations. For example, an application server 210 in an individual retail location may be linked to another centralized application server in the corporate office at a different location.

The application server 210 may include a memory and a processor. The memory may be any device, collection of devices, or circuitry that can store data. For example, the memory may be a computer-readable medium such as random access memory (RAM) coupled to a processor. The processor may execute computer-executable program instructions stored in memory. The processor may include a microprocessor, an ASIC, and/or state machines. The processor may include, or may be in communication with the computer-readable medium, which stores instructions that, when executed by the processor, cause the processor to perform the steps described herein. Embodiments of computer-readable medium include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable mediums may transmit or carry instructions to a computer, including a router, private or public network, or other transmission device or channel, both wired and wireless. The instructions may include code from any suitable computer-programming language, including, for example, C, C++, C#, Visual Basic, Java, Python, Perl, and JavaScript.

In the embodiment shown in FIG. 2, the application server 210 is in communication with a point of sale ("POS") system 250. The POS system 250 may collect product, payment, and other information relating to products and customers. For example, a POS system 250 may collect data regarding whether a product has been purchased and customer information relating to the products that were purchased by a consumer. According to one embodiment, the POS system 250 may communicate with the first tag 220 and/or the second tag 230 either directly, through the application server 210, and/or through a transceiver 240.

According to one embodiment, the application server 210 is in communication with a legacy system 260. A legacy system 260 may include, for example, other systems for ordering, inventory control, employee management, and other information helpful to the operation of a supply chain. For example, the application server 210 may compare information received from the first tag 220 and/or the second tag 230 to information contained in a legacy system 260. In one embodiment, the legacy system 260 is in communication with a POS system 250, an application server 210, a first tag 220, and/or a second tag 230 either directly or through one or more transceivers 240.

Initializing a Tag

Figure 3:
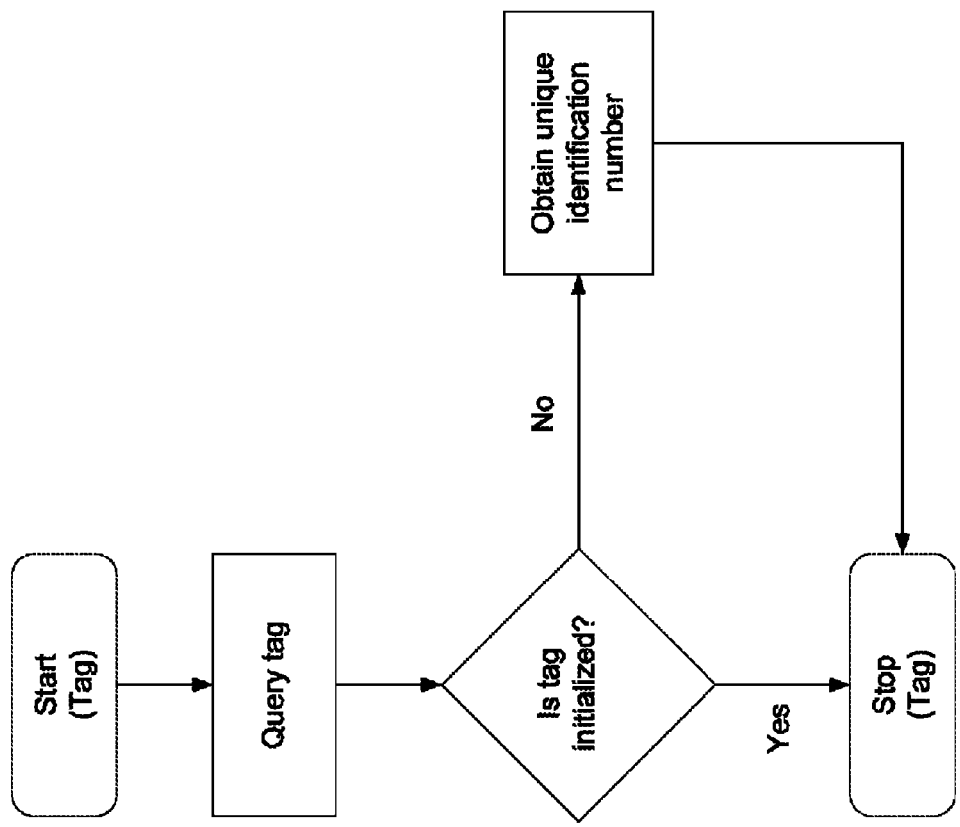
FIG. 3 is a flow chart of a process for initializing a tag according to one embodiment of the present invention.

In some embodiments, before a tag 101 may be associated with a second device, the tag 101 is initialized. FIG. 3 shows one example of a process for initializing a tag. In the embodiment shown in FIG. 3, the tag 101 receives a wireless communication from a second device. The wireless communication includes a query as to whether the tag 101 is initialized. If the tag 101 is not initialized, then the tag 101 receives a unique identification number from the second device, which may be an application server, a second tag, a transceiver, or other device. In other embodiments, the tag 101 may be pre-initialized based upon a unique identification number, such as a MAC address.

Figure 4:
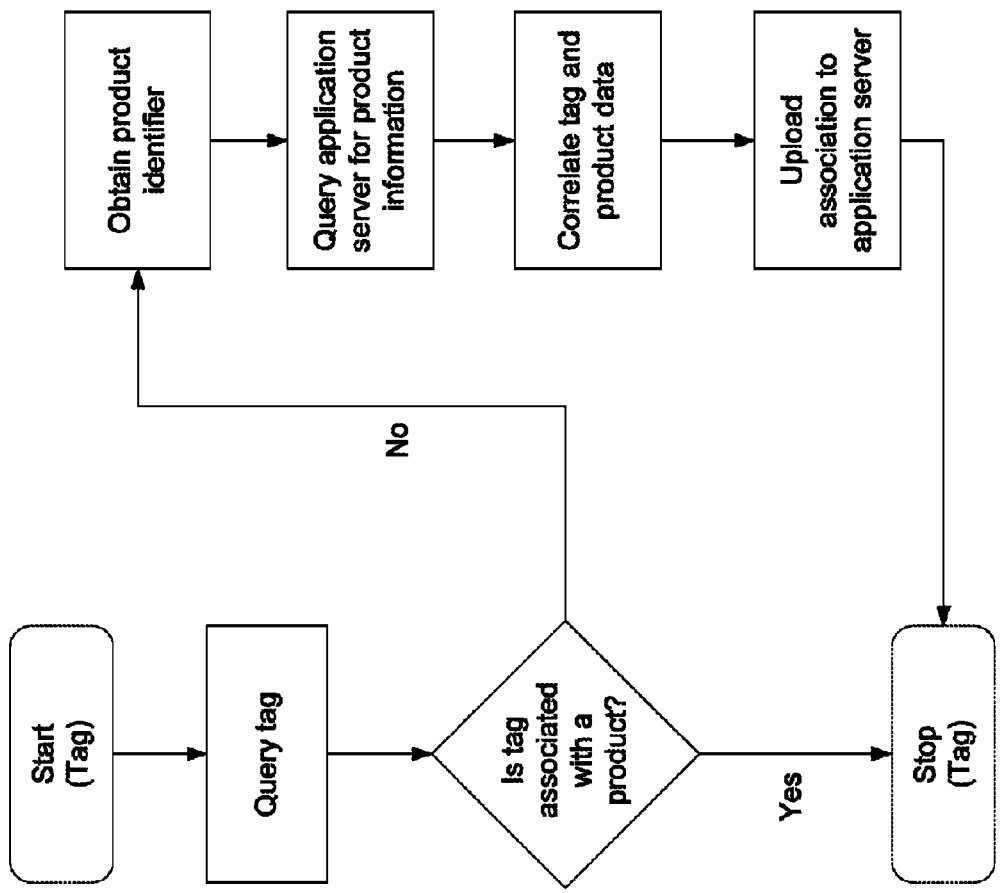
FIG. 4 is a flow chart of a process for an initialized tag receiving a product identification and other product data from a second device according to one embodiment of the present invention.

In some embodiments, a tag 101 receives additional data elements before associating with a second device. For example, the tag 101 may receive a data element representing a product identification of the product to which the tag 101 is associated. FIG. 4 shows one example of an initialized tag 101 receiving a product identification from a second device. In FIG. 4, a tag 101 receives a wireless communication from a second device. The wireless communication includes a query as to whether the tag is associated with a product. If the tag 101 is not associated with a product, then the tag 101 receives a product identifier from the second device. In the embodiment shown in FIG. 4, the tag also 101 transmits a wireless communication that includes a query for product data based on the product identifier, to the application server 210. In this embodiment, the application server 210 communicates data elements regarding the product to the tag 101 and the tag 101 stores the data elements in memory 161. The second device may communicate data elements regarding the product to the tag 101 and the tag 101 may stores the data elements in memory 161. Furthermore, in the embodiment shown in FIG. 4, the tag 110 communicates the association formed between the tag 101 and the product to the application server 210. In other embodiments, the second device may communicate an association formed between the tag 101 and the product to the application server 210.

Figure 5:
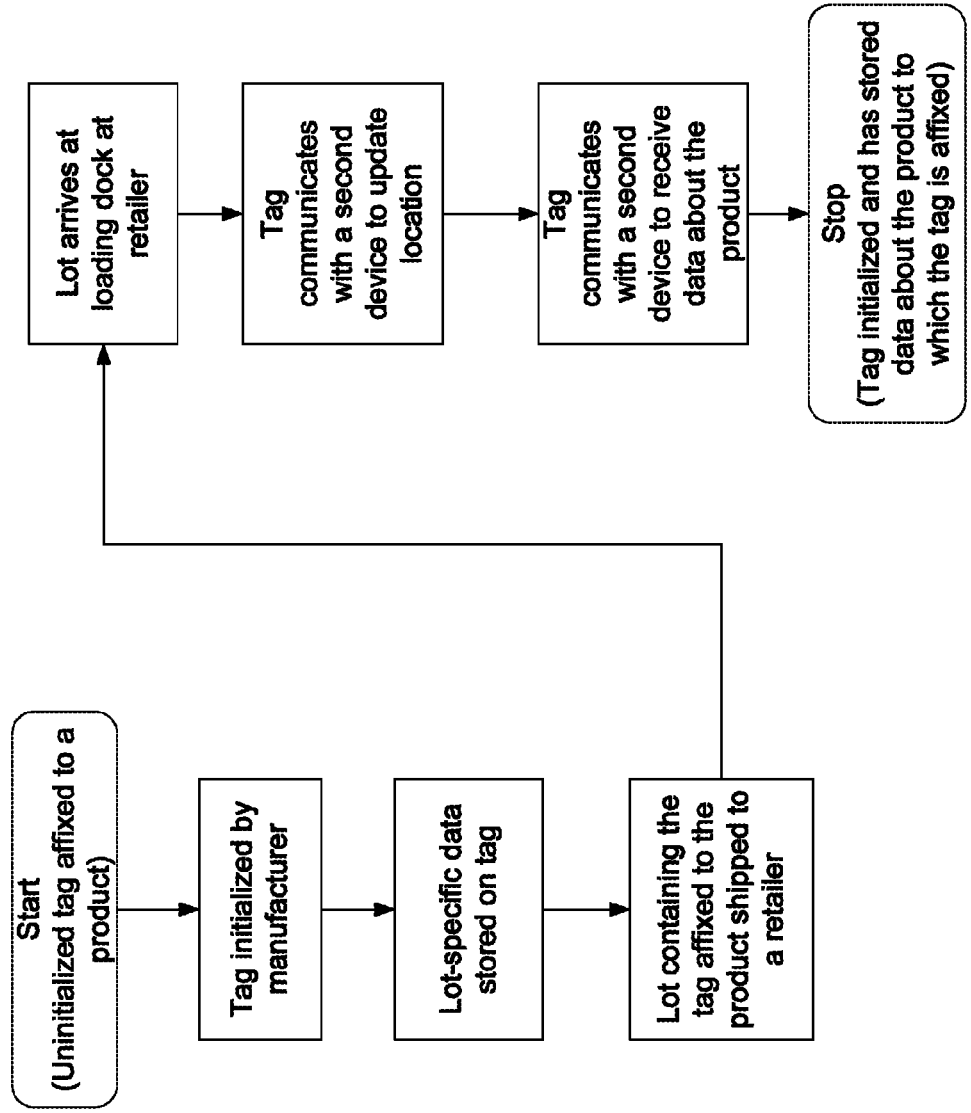
FIG. 5 is a flow chart of a process for initializing a tag at one time and storing data elements regarding a product at a second time according to one embodiment of the present invention.

According to one embodiment, tags 101 may be initialized at a first time and store data elements regarding an association at a second time. In the embodiment shown in FIG. 5, the tag 101 is initialized by a manufacturer and lot-specific data is stored on the tag 101. In this embodiment, the lot, which can include numerous products associated with tags, is shipped to a retailer. Data may be stored on the tag 101 by one or more intermediary parties between the manufacturer and the retailer. For example, data elements representing information about a wholesaler may be stored on the tag 101. In another embodiment, data elements representing various locations where the tag 101 has been located is stored on the tag 101. Some data elements may represent condition data, such as information received from a temperature sensor, and are stored on the tag 101. In some embodiments, when the tag 101 arrives at the retailer's loading dock, the tag 101 can communicate with a second device and store data elements representing information about the location of the tag 101 and other data elements representing information about the individual product.

Forming an Association

Figure 6:
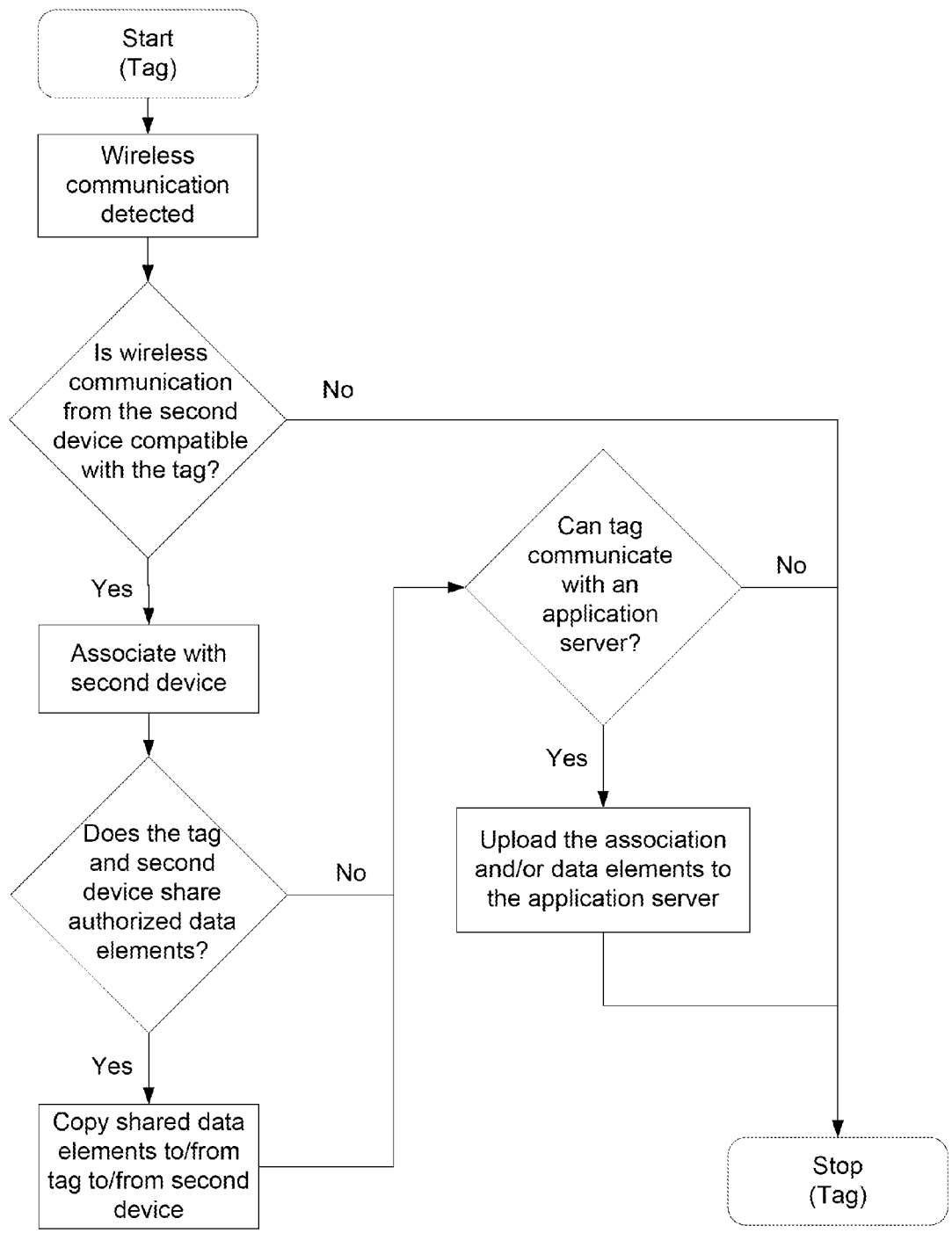
FIG. 6 is a flow chart of a process for forming an association between a tag and a second device according to one embodiment of the present invention.

FIG. 6 depicts one embodiment in which a tag 101 may form an association with a second device. For example, when a wireless communication is detected by the wireless communications device 151 of the tag 101, the processor 157 can determine whether the wireless communication is from a second device that is a compatible device. A compatible device may be a device with which the tag 101 is configured to communicate. If the wireless communication is from a compatible second device, then the tag 101 may associate with the second device. Furthermore, as shown in FIG. 6, if the tag 101 shares authorized data elements with the second device, then one or more of the data elements may be copied to the tag 101 and/or the second device. In addition, if the tag 101 can communicate with an application server 210, data regarding any association formed between the tag 101 and the compatible device and/or other data elements on the tag 101 may be uploaded to the application server 210. In some embodiments, the application server 210 may transfer data received from the tag 101 to other devices such as a legacy system 260, a POS system 250, or another device. Furthermore, the tag 101 may ignore one or more consecutive wireless communications from a second device if the second device is not compatible with the tag 101. In other embodiments, the tag 101 may ignore one more identical wireless communications from a second device even if the second device is compatible with the tag 101.

As demonstrated by FIG. 6, copies of data elements stored on the tag 101 may be stored on an application server 210. In some embodiments, storing data elements on the tag allows data to be received by a second device such as, for example, a handled transceiver without requiring communications with an application server 210. Thus, according to some embodiments, the redundancy of one or more data elements may reduce the load on the overall system.

Price Change

One embodiment of the present invention may provide automated price changes for a tag 101 associated with a product. For example, referring to FIG. 2, a new price for a product may be entered by an employee into the application server 210, the legacy system 260, or the POS system 250. Because of the real-time data link between these devices and the first tag 220 and the second tag 230, a price change may be made effective immediately. For example, in one embodiment, the application server 210 transmits a command to the first tag 220 that is associated with a product, along with an amount of a new price for the product. In this example, the first tag 220 can receive the command from the application server 210 and can change the data element on the tag that represents the price and can store the new price in the memory of the first tag 220. In other embodiments, the application server 210 may transmit one or more commands that are received by the first tag 220 and the second tag 230. In this embodiment, if the first tag 220 is associated with a product for which the application server 210 is changing the price, the data element on the tag representing the price can be updated in the memory of the first tag 220. If, however, the first tag 220 is not associated with a product for which the application server 210 is changing the price, the data elements on the first tag 220 can remain unchanged. In some embodiments, a similar process may occur with regard to the second tag 230. Thus, in one embodiment, by broadcasting a command to all the tags in the system or by sending a command specifically to each of the tags, the price on all the tags associated with a particular product may be changed system-wide. In some embodiments, a price change may be implemented uniformly for all products or a category of products in a system. For example, the price of all products that are associated with a category, such as all soft drinks, may be changed to a particular price or by a percentage of the current price. In addition, embodiments of the present invention allow price changes to be performed with minimal human involvement.

In some embodiments, the command sent to a tag 101 to change a price may include a time for which the price is to be effective. For example, a command may include that at a certain time on a certain date a tag 101 associated with a particular product is to change the price associated with the tag 101.

In some embodiments, a confirmation message is sent back to the device that solicited the price change. For example, in one embodiment, a confirmation message is sent from the first tag 220 to the application server 210 confirming that the price on the first tag 220 has been changed. Numerous safeguards, such as password protection, server authentication, SSL technologies, or other safeguards, may be incorporated into embodiments of the present invention.

Detecting Damage/Spoilage

In one embodiment of the present invention, the tag 101 can detect damage or spoilage of a supply chain item to which the tag 101 is associated. For example, the tag 101 may include a sensor 159 that is a thermocouple sensor capable of recording temperature fluctuations in meat or dairy products to which the tag 101 is associated. In another embodiment, the sensor 159 may include an accelerometer designed to record drops or falls exceeding the specifications for a particular product to which the tag 101 is associated. The sensor 159 may include an ethylene gas sensor to record spoilage of products such as, for example, milk or eggs.

In one embodiment of the present invention, a tag 101 may include one or more sensors 159 that allow a delivery of goods to be checked for damage or spoilage with minimal human involvement. For example, in one embodiment, each product in a delivery is associated with a tag 101. When a shipment arrives, each of the tags 101 communicates with the application server 210 through a transceiver 240. The tags 101 communicate information received from one or more sensors 159. Based upon the data received from the tags 101, the application server 210 may be able to determine whether any of the goods have spoiled or been damaged during shipping. Thus, certain embodiments of the present invention allow for damage to and/or spoilage of delivered goods to be determined with minimal human involvement.

In one embodiment, damage and/or spoilage may be determined based on a "deliver-by" date in a data element on the tag 101. For example, a wholesaler may upload a deliver-by date to a tag 101 associated with a product, which the retailer can check when the delivery arrives. According to one embodiment, a tag 101 may be used to determine whether a product is out of date. For example, in one embodiment, a manufacturer, wholesaler, or retailer may upload a sell-by date to a tag 101 associated with a product. The tag 101 communicates the sell-by date to the application server 210 through the transceiver 240. Thus, the application server 210 may be able to determine whether the current date is past the sell-by date. If a tag 101 associated with a product is past the sell-by date, the application server 210 may generate a report or otherwise direct personnel to locate the product and remove the product from circulation. In other embodiments, the application server 210 may generate a report, or otherwise alert personnel, indicating that a tag 101 associated with a product is approaching the sell-by date. Thus, according to this embodiment, the manufacturer, wholesaler, or retailer may be able to take actions such as reducing the price of the product to sell the product before the sell-by date.

Detecting Authenticity

In one embodiment of the present invention, a tag 101 may be used to confirm the authenticity of a supply chain item associated with the tag 101. In one embodiment, a manufacturer uploads a confirmation code to the memory 161 of the tag 101 associated with the product. A confirmation code may confirm that the product is genuine rather than a counterfeit substituted at some other point in the supply chain. For example, in an embodiment where the manufacturer stores a confirmation code to the memory 161 of the tag 101 associated with a product, a retailer can assess the authenticity of the product by verifying the confirmation code on the tag 101.

Tracking

According to one embodiment of the present invention, the location of a tag 101 can be tracked throughout all or part of a supply chain. In embodiments of the present invention, the system can record information regarding delivery such as the date and time of delivery, the person that signed for delivery, the location where the delivery occurred, the condition of the delivery, or other information. The ability to locate and/or track a tag 101 associated with a supply chain item may provide numerous benefits. For example, in one embodiment, by receiving current and historical locations of a tag 101, the path a tag 101 has traveled can be tracked and monitored using tracking software.

Referring now to FIG. 2, one embodiment of the present invention allows the first tag 220 to form an association with the second tag 230. In one embodiment, an association is stored on the first tag 220 and/or the second tag 230. In other embodiments, an association is communicated with and stored on the application server 210. An association may result in the transfer of information between the first tag 220, the second tag 230, and/or the application server 210. For example, if the first tag 220 is associated with a supply chain item having a specified location, the data on the second tag 230 may be updated to reflect the location of the first tag 220. The location of the second tag 230 may be tracked based the location of the first tag 220 and/or other tags. As the supply chain item associated with the second tag 230 is moved throughout a supply chain, the location of the second tag 230 may be updated as it communicates with additional tags 101. In certain embodiments, each of these associations as well as the changes in data on the second tag 230 may be communicated to an application server 210 either directly or through a transceiver 240. In one embodiment, software installed on the application server 210 can track the current and historical information regarding the first tag 220, the second tag 230, or other tags. Therefore, the application server 210 is able to track the location of tags in some embodiments of the present invention by examining the current and historical location of the tags.

In another embodiment, the first tag 220 is associated with a pallet of products one of which is a product associated with the second tag 230. The first tag 220 may receive a command from a second device stating that the location of each tag associated with each product in the pallet of products needs to be updated. In some embodiments, the location of the first tag 220 is updated based upon the received command. In other embodiments, the first tag 220 communicates with the second tag 230 and other tags associated with products in the pallet of products to update the location of the second tag 230 and the other tags.

Locating Items/Inventory Management

Figure 7:
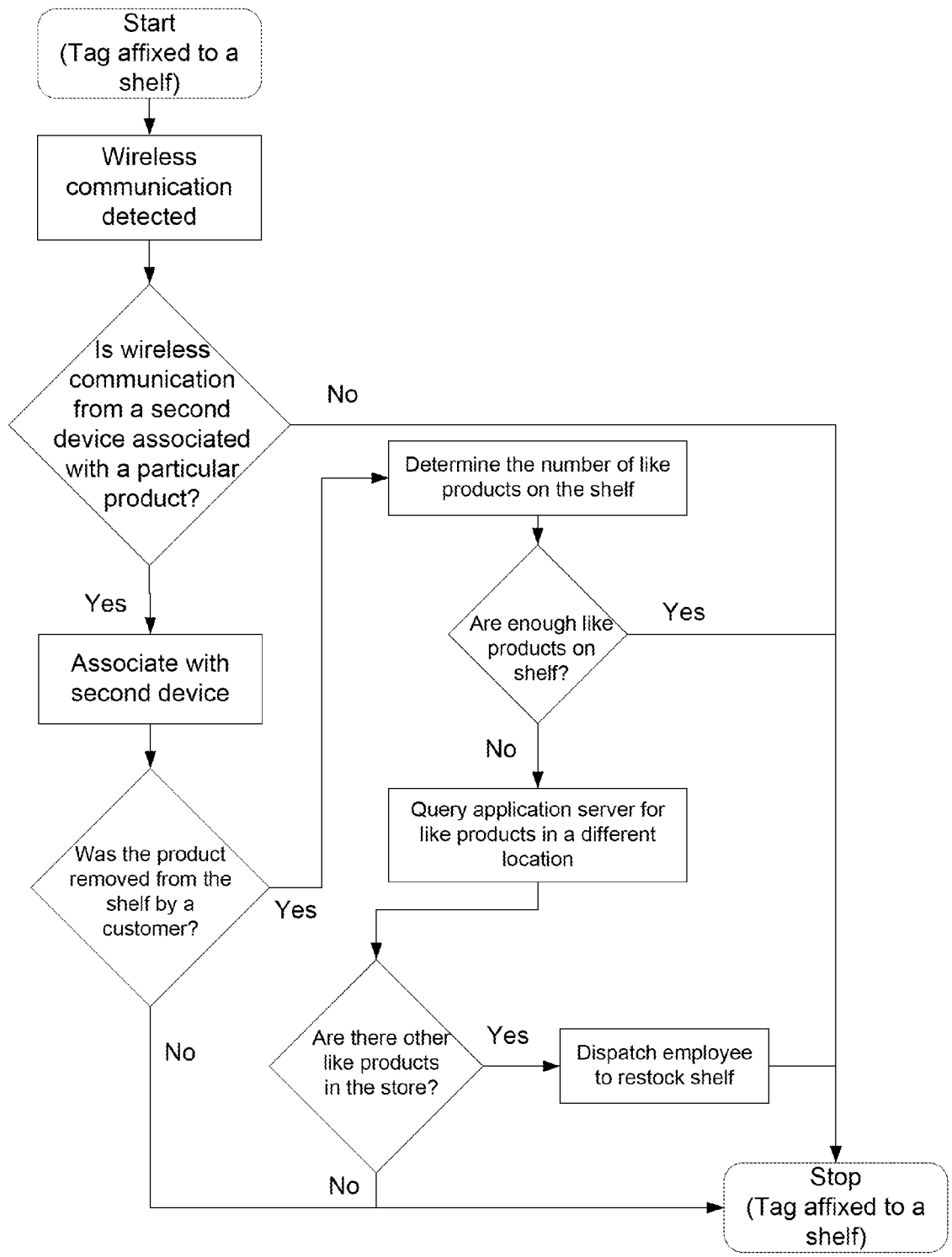
FIG. 7 is a flow chart of a process for inventory management according to one embodiment of the present invention.

FIG. 7 demonstrates a flow chart for inventory management according to one embodiment of the present invention. As shown in FIG. 7, a wireless communication is detected by a tag 101 that is affixed to a shelf and represents a location where a particular product is displayed. In this embodiment, the tag 101 determines whether the wireless communication is from a second device that is associated with the particular product. If the wireless communication is from a second device that is associated with the particular product, then the tag 101 may associate with the second device. Furthermore, according to FIG. 7, the tag 101 determines whether the product was removed from the shelf by a customer. If the product was removed from the self, then the tag 101 communicates with other devices, such as other tags, to determine the number of like products on the shelf. According to FIG. 7, if there are not enough like products on the shelf, then an application server 210 is queried to determine if there are other like products in a different location such as, in a storeroom. In this embodiment, if there are other like products in the store, then an employee is dispatched to restock the shelf.

In other embodiments of the present invention, software on the application server 210 can locate misplaced inventory. For example, the application server 210 may contain the current location of a tag 101 associated with a product. The application server 210 may also contain a predetermined location specifying where the product should be. For example, the predetermined location for the product may be the shelf that the product should be displayed on. Based upon the current location of the tag 101 and the predetermined location for the product, the application server 210 can determine whether the tag 101 associated with the product is in the proper location. In certain embodiments, the application server 210 can generate a report of all the tags 101 associated with products that are not in their predetermined location. This may allow, for example, an employee to obtain a list of misplaced items, locate the items, and return them to the proper location.

In one embodiment of the present invention, software on the application server 210 can perform an inventory count based on information received from the tags 101. For example, in one embodiment, the application server 210 can send a command requesting a response from each tag 101 associated with a particular product. Based upon the responses received from the tags 101, the application server 210 can compare the number of responses with an expected number of responses for the product based upon a previous inventory count, the number of products that have been received, and the number of products that have been sold. In this way, the application server 210 can maintain accurate real-time inventory levels as well as detect loss due to theft based upon the difference in the previous inventory count and the current inventory count and taking into consideration the number of products sold, received, or otherwise.

In addition, in one embodiment, the application server 210 can differentiate between locations of tags 101 associated with a particular product. For example, the application server 210 may expect that tags 101 associated with a particular product can be found in two locations such as, for example, on a shelf and in a storage room. In one embodiment, the application server 210 may count the number of tags 101 associated with the product that are on the shelf. If this number is below a set threshold, then the application server 210 may generate a report or otherwise notify an employee that the inventory on the shelf is low. In addition, the application server 210 may determine the number of tags 101 associated with the product are located in the storage room. The application server 210 may generate a report or otherwise notify an employee whether there are additional products in the storage room that can be used to restock the shelf with the product. In addition, the application server 210 may generate a report or otherwise notify an employee based on the number of tags 101 associated with a product and a specified threshold that additional products need to be ordered.

Theft Prevention/Deactivating a Tag

Figure 8:
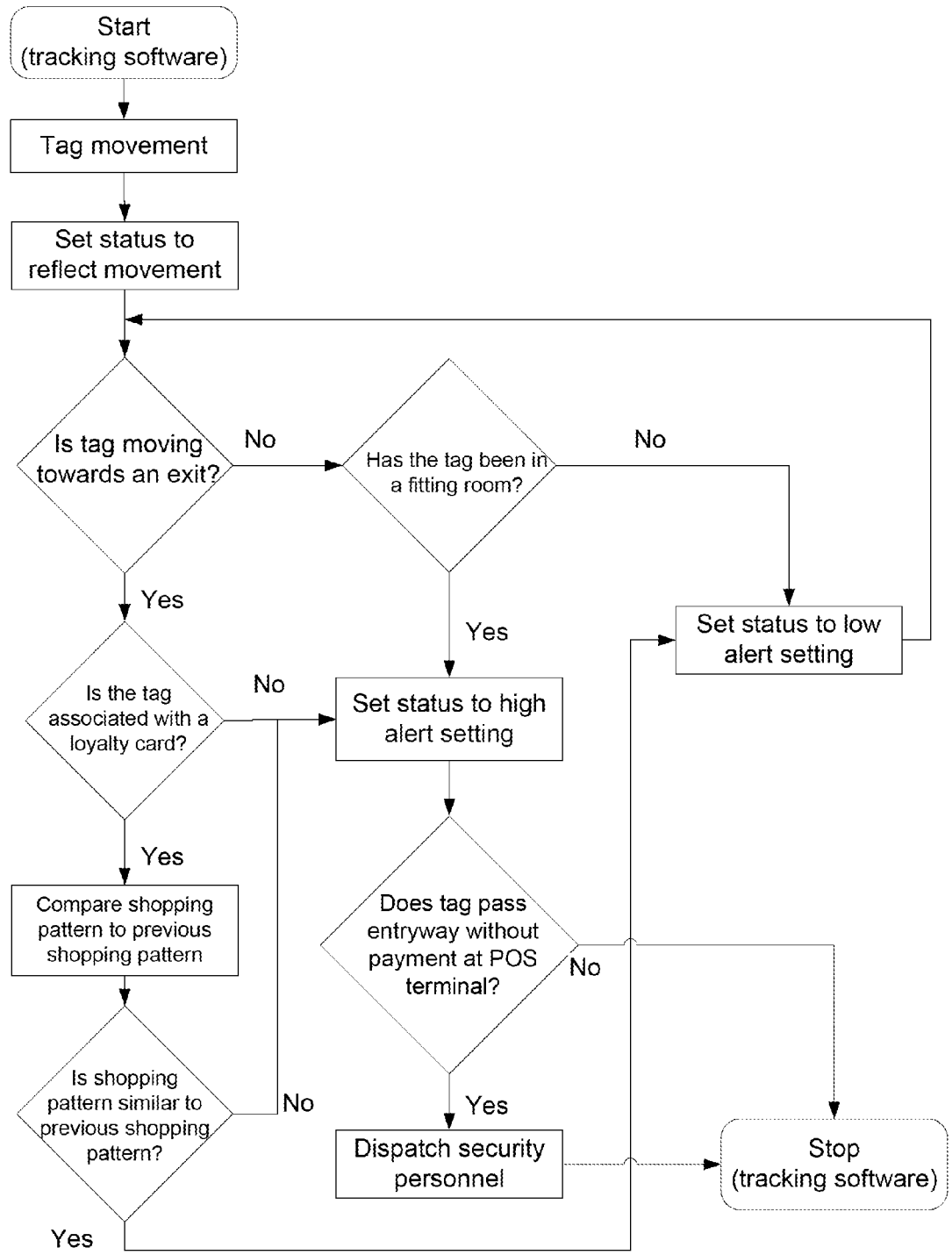
FIG. 8 is a flow chart of a process for implementing a theft deterrence rule using tracking software according to one embodiment of the present invention.

FIG. 8 provides a theft deterrence rule for tracking software according to one embodiment of the present invention. As shown in FIG. 8, the tracking software detects movement of a tag 101 associated with a supply chain item. The tracking software sets the status to reflect that the tag 101 is moving. In this embodiment, the tracking software next determines if the tag 101 is moving towards an exit. If not, the tracking software determines whether the tag 101 has been in a fitting room. If the tag 101 has not been in a fitting room, then the tracking software sets a status to reflect a low alert setting. If, the tag 101 has been in a fitting room the tracking software sets a status to reflect a high alert setting. If the tag 101 is moving towards an exit, then in this embodiment the tracking software determines whether the tag is associated with a loyalty card. If the tag 101 is not associated with a loyalty card, then the tracking software sets a status to reflect a high alert setting. If the tag 101 is associated with a loyalty card, then the tracking software compares the current shopping pattern with those of a previous shopping pattern. In this embodiment, if the current shopping patter is similar to the previous shopping pattern, then the tracking software sets a status to reflect a low alert setting. If, however, the current shopping pattern is not similar to the previous shipping pattern, then the tracking software sets a status to reflect a high alert setting. When the status is a low alert setting, the tracking software continues to monitor whether the tag 101 is moving towards an exit. When the status is a high alert setting, according to this embodiment, the tracking software monitors the location of the tag 101 to determine whether the tag passes an entryway without payment at a POS terminal. If the tag 101 passes an entryway but has been paid for, then the tracking software stops tracking the tag 101. If the tag 101 passes an entryway without payment at a POS terminal, then the tracking software dispatches security personnel.

In one embodiment of the present invention, a tag 101 may be deactivated based at least in part on data received from a second device. Referring to FIG. 2, in one embodiment the first tag 220 which is associated with a product may be deactivated based upon data received from the POS system 250, the application server 210, or the second tag 230. For example, the first tag 220, may receive a deactivation command from the POS system 250 when an employee scans the product associated with the first tag 220 when a customer purchases the product.

In other embodiments, the application server 210 may contain rules to differentiate between an attempted theft of a product and the failure of an employee to charge a customer for a product. For example, referring to FIG. 2, the first tag 220 may be associated with a product and the second tag 230 may be associated with an employee. The application server 210 may contain software which sends a command to the first tag 220 telling the first tag 220 to deactivate based upon information available to the application server 210. For example, in one embodiment, the first tag 220 may be associated with the second tag 230 and based upon this association and the location of the second tag 230, the application server 210 may send a deactivation command to the first tag 220. In other embodiments, the application server may use information about other tags to determine whether to send a deactivation command to the first tag 220. For example, the application server 210 may analyze the current and/or historical associations that the first tag 220 has or has had with other tags. In addition, the application server 210 may analyze other factors, such as, whether these other tags are currently activated or deactivated or their current and/or historical location. In embodiments of the present invention, the ability to deactivate a tag may help to prevent false alarms and false accusations of theft by a retailer. In certain embodiments, the first tag 220 and/or the application server 210 may communicate with a POS system 250 to add an unpaid item to the customer's invoice.

Consumer Habits/Advertising

Figure 9:
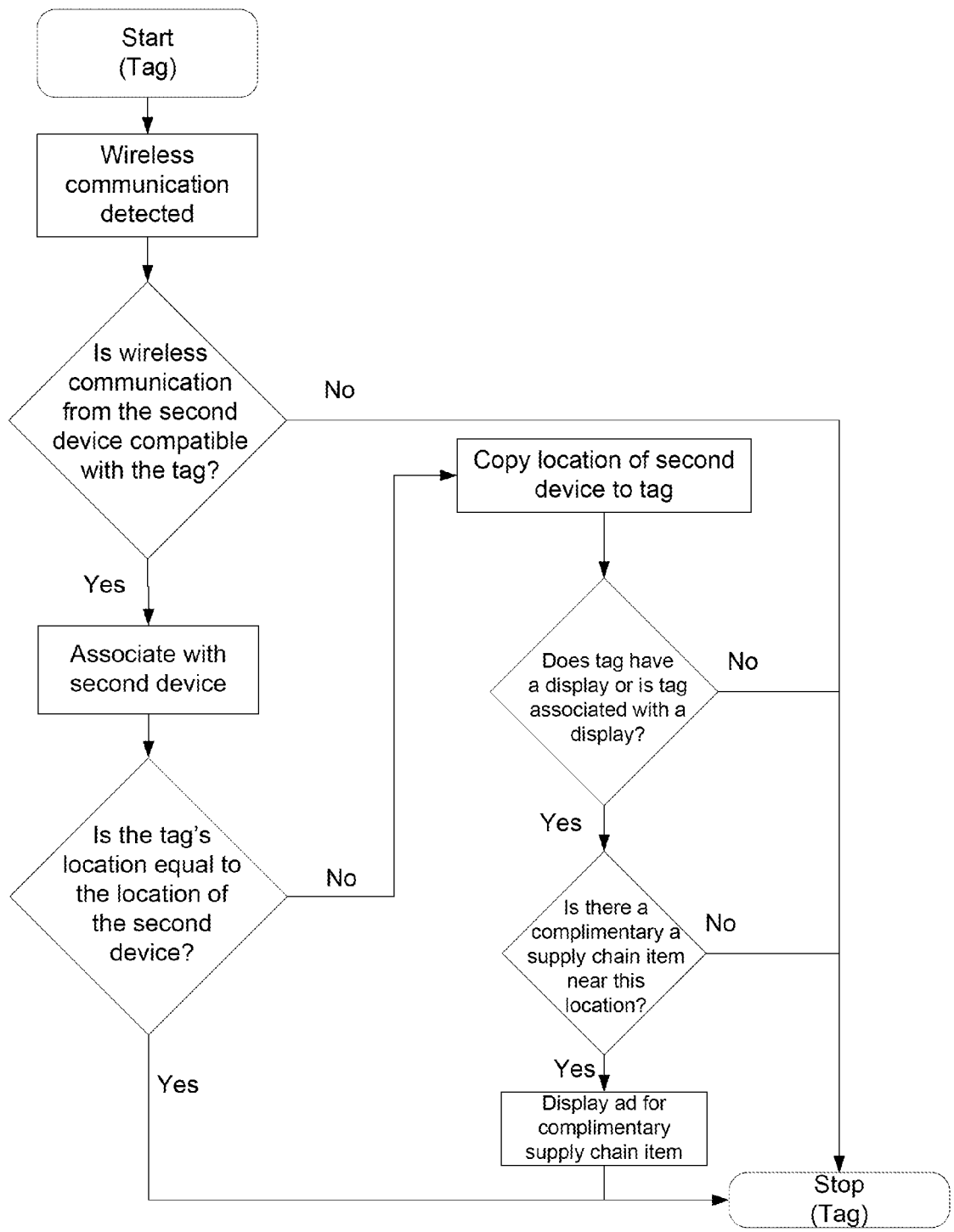
FIG. 9 is a flow chart of a process for configuring an advertisement of a complementary supply chain item according to one embodiment of the present invention.

FIG. 9 depicts one embodiment in which a complementary supply chain item is advertised to a customer. In this embodiment, a wireless communication is detected by a tag 101. If the wireless communication from the second device is not compatible with the tag 101, then the tag 101 ignores the wireless communication. If the wireless communication from the second device is compatible with the tag 101, then the tag 101 associates with the second device. Furthermore, in this embodiment, if the location of the tag 101 is different from the location of the second device, then the location of the second device is copied to the tag 101. According to this embodiment, if the tag 101 has a display or is associated with a display then the tag wirelessly communicates with the second device or another device to determine if there is a complimentary supply chain item near the location of the tag 101. If there is a complimentary supply chain item, then an advertisement for the complimentary supply chain item is displayed. Thus, according to some embodiments, a retailer may send advertisements to individual customers.

In one embodiment, the ability to establish a location of a tag 101 may provide information about a consumer's buying habits. For example, the application server 210 may be able to identify and record the time that a customer removed a tag 101 associated with a product from a shelf. In another embodiment, the path a customer follows while shopping may be analyzed based upon, for example, a tag 101 that is associated with the customer such as by a loyalty or membership card. Furthermore, a customer's purchasing history may be gathered, recorded, analyzed, or otherwise.

In one embodiment where a customer does not actually purchase an item associated with a tag 101, information may still be gathered about a customer's visit. For example, a tag 101 may be associated with a particular basket or cart. In this embodiment, as a customer places items containing tags into the cart or basket, the location of the tags may be updated to reflect that they are now in a customer's cart. In situations, such as where the customer has a membership card or a loyalty card containing a tag, associations may be formed and the application server 210 may be able to determine not only which items have been placed in a cart or basket but also who is shopping. Based upon, for example, associations that are formed by the tag associated with the loyalty card, the basket or cart, products the customer puts into the basket or cart, and/or other tags the path of a customer may be tracked through an establishment. Thus, whether a customer makes a purchase or not, valuable consumer habits may be made.

In one embodiment, a tag 101 including a display 163 may be associated with a cart or basket. In this example, the application server 210 may send one or more advertisements to the tag 101. The advertisement may be, for example, based upon products that the customer has purchased in the past. The advertisement may be based upon products associated with tags that the customer has placed in the cart or basket. The advertisement may be based upon buying habits of consumers in general. For example, the application server 210 may determine that if a consumer purchases product A, it is likely that the consumer would purchase product B. Thus, if a consumer places a tag 101 associated with product A into a cart or basket, the application server 210 may send an advertisement to the tag 101 including a display 163 and associated with the cart or basket suggesting that the consumer purchase product B. In some embodiments, an advertisement may include a discount for purchasing one or more products. Furthermore, in some embodiments, the advertisement may be based upon the historical, current, or projected path of the consumer. It should be appreciated that an advertisement may be based on any one or the combination any number of factors.

Purchasing Using Tags

Tags according to some embodiments can be used to facilitate purchasing of products or other items that may be associated with some of the tags. For example, a tag associated with a product may have stored in memory a price for the product. As a customer moves the product, and the associated tag, by a second device in the store (which may be proximate the store exit), the tag can provide the price for the product and the device can communicate with a customer device. For example, the customer device may be a mobile telephone or a "smart" device that includes payment information for the customer. The price of the product can be automatically charged to the customer via information from the customer device. In some embodiments, the customer device is, or is associated with, a second tag in which is stored in memory payment information for the customer.

For example, and referring again to FIG. 2, a first tag 220 associated with a customer may be used to purchase a product associated with a second tag 230. In some embodiments, the first tag 220 associated with a customer contains payment information about the customer stored in memory. For example, the payment information may be a credit card type, credit card number, expiration date, bank account information, or other information about the customer. The first tag 220 associated with a customer may contain customer information, such as a customer number, stored in memory. The first tag 220 associated with a customer may be associated with and/or in communication with the second tag 230 associated with a product, a transceiver 240, and/or an application server 210.

In one embodiment, the application server 210 communicates with the first tag 220 associated with a customer and communicates with the second tag 230 associated with a product. The communication may be direct or may be through the transceiver 240. The application server 210 may use data received from the first tag 220 associated with a customer to determine how the customer is to pay for the product associated with the second tag 230. For example, the application server 210 may receive payment information from the first tag 220 associated with a customer. In some embodiments, the application server 210 receives information such as a customer number from the first tag 220 associated with a customer and uses this information to determine payment information, such as by determining a preferred credit card previously provided by the customer and associated with the customer number.

In one embodiment, the application server 210 uses data received from the second tag 230 associated with a product to determine an amount to charge the customer for the product. In another embodiment, the application server 210 uses data received from the first tag 220 associated with a customer to determine an amount to charge the customer for the product associated with the second tag 230. For example, the first tag 220 associated with a customer may communicate with a second tag 230 associated with a product to obtain pricing information about the product. The first tag 220 associated with a customer may also communicate with and receive pricing information from other tags associated with products that a customer is planning to purchase. In one embodiment, the first tag 220 associated with a customer communicates with the application server 210 to provide the application server 210 with information about each product the customer is planning to purchase. In another embodiment, the first tag 220 associated with a customer communicates with the application server 210 to provide the application server 210 a total amount for the products that the customer is planning to purchase.

The application server 210 and/or the first tag 220 associated with a customer may be in communication with numerous other tags. For example, the application server 210 and/or the first tag 220 associated with a customer may use data received from other tags to determine a total price to charge the customer associated with the first tag 220. In one embodiment, the application server 210 is in communication with another device, such as a mobile phone, that contains payment information about a customer. The application server 210 and/or the first tag 220 associated with a customer may be associated with, and/or in communication with, any number of additional tags or other devices.

In some embodiments, the application server 210 is configured to process a payment based upon information received from the first tag 220 associated with a customer, the second tag 230 associated with a product, and/or a second device which are used to determine a total price to charge the customer. In other embodiments, the application server 210 is in communication with a POS system 250 and/or a legacy system 260 that processes the payment. The application server 210 may send a confirmation regarding whether the payment is successful to the first tag 220 associated with a customer, the second tag 230 associated with a product, and/or a second device. In one embodiment, the application server 210 and/or the first tag 220 associated with a customer may send a command to the second tag 230 associated with a product and/or additional tags to deactivate. In other embodiments, the second tag 230 associated with a product may deactivate based upon the confirmation code received from the application server 210 and/or the first tag 220 associated with a customer.

The foregoing description of some embodiments of the invention has been presented only for the purpose of illustration and description and is not intended to be exhaustive or to limit the invention to the precise forms disclosed. Numerous modifications and adaptations thereof can be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

What is claimed is:

1. A tag configured for being physically associated with a supply chain item, the tag comprising:
   a processor;
   a memory configured for storing data elements;
   a wireless communications device configured for transceiving wireless communications with a second device that is physically separate from the tag, the wireless communications comprising a representation of at least one of the data elements comprising a characteristic associated with the tag, the representation being usable by the second device to determine information to wirelessly transmit to the tag,
   wherein the processor is configured for executing code stored in the memory to respond to the information wirelessly transmitted from the second device by configuring at least one of the data elements based on the information, wherein at least one of the data elements representing data is usable to process payment for the supply chain item, wherein at least one of the data elements representing data is usable to configure a display; and
   a display device, comprising:
      a display medium for visually displaying data;
      a display driver for translating data into a format displayable by the display medium; and
      a control sequencer for converting data received from the second device into a format readable by the display driver.

2. The tag of claim 1, wherein the second device comprises at least one of:
   a second tag;
   a point of sale system;
   a router having a transceiver and an antenna;
   an application server;
   a legacy system;
   a sensor; or
   a second display device.

3. The tag of claim 1, wherein the representation is a previously stored location of the tag,
   wherein the information is an updated location of the tag with respect to the second device,
   wherein the processor is configured for configuring the at least one of the data elements based on the information by replacing the previously stored location of the tag with the updated location of the tag in the at least one of the data elements in the memory.

4. The tag of claim 1, wherein the representation is a previously stored price of the tag,
   wherein the information is an updated price of the tag with respect to the second device,
   wherein the processor is configured for configuring the at least one of the data elements based on the information by replacing the previously stored price of the tag with the updated price of the tag in the at least one of the data elements in the memory.

5. The tag of claim 1, wherein the processor is configured for forming an association with the second device and storing the association in the memory in response to wireless communications with the second device, wherein the association represents a relationship between the tag and the second device that is usable by the tag to identify at least one of:
   a price of the product to which the tag is physically associated;
   a current location of the tag;
   a status of the tag;
   a permissions level of the tag;
   a zone of the tag;
   an association of the tag; or
   a condition of the tag.

6. The tag of claim 1, further comprising a power source comprising at least one of an alternating current source, a battery, or an ambient power source.

7. The tag of claim 1, further comprising a casing in which the memory, the processor, and at least part of the wireless communications device are disposed.

8. The tag of claim 1, further comprising a sensor for detecting environmental data representing information about an environment in which the tag is positioned,
   wherein the processor is configured for determining a damage level to a product associated with the tag based at least in part on the environmental data.

9. The tag of claim 1, further comprising a backplane for providing data transfer between the wireless communications device and the display device.

10. A system comprising:
   an application server;
   a tag configured for storing data elements and further configured for wireless communications with the application server and a second device physically separate from the tag,
   the second device being configured for wireless communications with the tag, wherein the wireless communications comprise a representation of at least one of the data elements comprising a characteristic associated with the tag,
   wherein the tag is configured for responding to the information wirelessly transmitted from the application server or the second device by configuring at least one of the data elements based on the information or wirelessly transmitting information about at least one of the data elements to the second device or the application server, wherein at least one of the data elements representing data is usable by at least one of the application server or the second device to process a payment for a product associated with the tag, wherein at least one of the data elements representing data is usable by a display device to display information about the product associated with the tag, wherein the tag comprises a second display device that includes:
   a display medium for visually displaying data;
   a display driver for translating data into a format displayable by the display medium; and
   a control sequencer for converting data received from the second device into a format readable by the display driver.

11. The system of claim 10, wherein the second device comprises at least one of:
   a second tag;
   a point of sale system;
   a router having a transceiver and an antenna;
   a second application server;
   a legacy system;
   a sensor; or
   a display.

12. The system of claim 10, wherein the representation is a previously stored price of the tag,
   wherein the information wirelessly transmitted from the application server or the second device is an updated price of the tag,
   wherein the tag is configured for configuring at least one of the data elements based on the information by replacing the previously stored price of the tag with the updated price of the tag in the at least one of the data elements.

13. The system of claim 12, wherein the tag is configured for wirelessly transmitting information about at least one of the data elements to the second device or the application server, wherein the information about at least one of the data elements is a confirmation that the updated price has been successfully updated by the tag.

14. The system of claim 10, wherein the representation is a location of the tag,
   wherein the information wirelessly transmitted from the application server or the second device is a request for the current location of the tag,
   wherein the tag is configured for wirelessly transmitting information about at least one of the data elements to the second device or the application server, wherein the information about at least one of the data elements is a current location of the tag,
   wherein the application server is configured for storing the current location of the tag.

15. The system of claim 14, wherein the application server is configured for generating a report based upon the current location of the tag and an expected location for the tag.

16. The system of claim 10, wherein the representation is an association with the second device of the tag,
   wherein the information wirelessly transmitted from the application server or the second device is a request for data about the association,
   wherein the tag is configured for wirelessly transmitting information about the association to the second device or the application server, wherein the information about at least one of the data elements is data about the association.

17. The system of claim 16, wherein the application server is configured for generating an advertisement based at least in part on the association.

18. The system of claim 17, wherein the application server is configured for transmitting the advertisement to a display.

19. The system of claim 10, wherein the representation is a previously stored status of the tag,
   wherein the information wirelessly transmitted from the application server or the second device is an updated status of the tag,
   wherein the tag is configured for configuring at least one of the data elements based on the information by replacing the previously stored status of the tag with the updated status of the tag in the at least one of the data elements.

20. The system of claim 10, wherein the representation is a previously stored condition of the tag,
   wherein the information wirelessly transmitted from the application server or the second device is an updated condition of the tag,
   wherein the tag is configured for configuring at least one of the data elements based on the information by replacing the previously stored condition of the tag with the updated condition of the tag in the at least one of the data elements.

21. The system of claim 10, wherein the representation is a previously stored authenticity code of the tag,
   wherein the information wirelessly transmitted from the application server or the second device is a request for the previously stored authenticity code of the tag,
   wherein the tag is configured for wirelessly transmitting information about at least one of the data elements to the second device or the application server, wherein the information about at least one of the data elements is the previously stored authenticity code of the tag,
   wherein the application server is configured to determine whether a product associated with the tag is authentic based at least in part upon the authenticity code.

* * * * *